United States Patent
Kuo et al.

(10) Patent No.: US 9,471,485 B2
(45) Date of Patent: Oct. 18, 2016

(54) DIFFERENCE L2P METHOD

(71) Applicant: Macronix International Co., Ltd., Hsinchu (TW)

(72) Inventors: Lung-Yi Kuo, Jhubei (TW); Hsin-Yi Ho, Hsinchu (TW); Chun-Hsiung Hung, Hsinchu (TW); Han-Sung Chen, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 444 days.

(21) Appl. No.: 13/926,633

(22) Filed: Jun. 25, 2013

(65) Prior Publication Data

US 2014/0281150 A1    Sep. 18, 2014

Related U.S. Application Data

(60) Provisional application No. 61/776,795, filed on Mar. 12, 2013.

(51) Int. Cl.
*G06F 12/02* (2006.01)

(52) U.S. Cl.
CPC ... *G06F 12/0246* (2013.01); *G06F 2212/7201* (2013.01); *G06F 2212/7208* (2013.01)

(58) Field of Classification Search
None
See application file for complete search history.

(56) References Cited

U.S. PATENT DOCUMENTS

| 6,938,116 | B2 | 8/2005 | Kim et al. | |
| 8,095,723 | B2 | 1/2012 | Kim et al. | |
| 8,239,619 | B2 | 8/2012 | Hung et al. | |
| 8,819,367 | B1* | 8/2014 | Fallone et al. | 711/162 |
| 2010/0293320 | A1 | 11/2010 | Li et al. | |
| 2011/0145477 | A1* | 6/2011 | Rudelic | 711/103 |
| 2013/0205076 | A1* | 8/2013 | Schuette et al. | 711/103 |

OTHER PUBLICATIONS

Lee, Sang-Won, et al., "A Log Buffer-Based Flash Translation Layer Using Fully-Associative Sector Translation", (2007), ACM Transactions on Embedded Computing Systems, (2007), vol. 6, No. 3, Article 18; 27 pgs.

* cited by examiner

*Primary Examiner* — Denise Tran
(74) *Attorney, Agent, or Firm* — Haynes Beffel & Wolfeld LLP

(57) ABSTRACT

A method for maintaining a data set includes storing a base copy of the data set in a first non-volatile memory having a first writing speed, storing changes to the data set in a first change data set in a second non-volatile memory having a second writing speed, and generating a current copy of the data set by reading the base copy and the changes. If a threshold number of entries in the first change data set is reached, then part or all of the first change data set is moved into a second change data set in the first non-volatile memory, where the generating step includes reading the second change data set. If a threshold number of entries in the second change data set is reached, then the current copy is generated by reading the base copy and the changes in the first and the second non-volatile memory.

25 Claims, 6 Drawing Sheets

DIFFERENCE L2P METHOD

CROSS-REFERENCE TO RELATED APPLICATIONS

This application claims the benefit of U.S. Provisional Patent Application No. 61/776,795, filed 12 Mar. 2013.

FIELD OF THE INVENTION

The present invention relates to memory devices and systems including memory management.

DESCRIPTION OF RELATED ART

In memory management, logical addresses used by application programs are mapped to physical addresses used by physical memory devices. A logical to physical address translation table can be maintained for access by read and write operations executed by application programs.

NAND flash is a popular type of high capacity, non-volatile memory. NAND flash is often page addressable, and configured for operations, including block erase, page program, and page read. A page includes a relatively large number of bits, such as 2K bits. A block can include larger amounts of data, including many pages. Some NAND flash devices are configured so that a page can be read and programmed in parallel so that the memory access times are shared. Memory management logic can be configured to take advantage of page mode operations by implementing logical to physical ("L2P") address mapping on a page basis.

Also, in some NAND flash devices, before a page program operation is executed, a block erase operation can be executed for a block that includes the target page. In systems using these devices, memory management logic can be used to keep useful data in some pages in a block while erasing other pages in the block. For example, the useful data in the block being erased is copied to another block. When the page is moved, the logical to physical address translation table must be updated. Also, other processes such as wear leveling and the like, move data in the physical memory to improve performance of the system. These processes can all impact the logical to physical translation table, requiring update for every move. Similar scenarios are seen in other types of flash memory, and in other types of non-volatile memory technologies.

The structure of a logical to physical address translation table can vary with algorithms used that impact the mapping between logical and physical addresses. For example, the algorithms can be configured for a page mode or for a block mode mapping. Page mode mapping requires a larger logical to physical address translation table, with entries for every page in the physical memory. For instance, NAND flash memory systems such as Solid State Drive (SSD) or embedded Multi-Media Card (eMMC) that use page mode algorithms require relatively large logical to physical address translation tables.

The logical to physical address translation table is an important aspect of memory controller technology, and must be kept accurate and current at all times. So many systems store the table in volatile memory, such as SRAM or DRAM that can be quickly read and written in a byte or word mode. When there is a power loss, the current logical to physical address translation table in the volatile memory is lost, and must be reconstructed. For this reason, a backup copy of the table is kept in non-volatile memory, such as in the NAND flash itself. On recovery from a power loss or reset, the backup copy is used to reconstruct the main table in the volatile memory.

However, the process of keeping the backup copy current may not be as fast as that used for the main table. For example, if the backup copy is kept in a page mode NAND flash, then updates require page mode read and writes. These page mode reads and writes are relatively slow, and can be subject to the problems of block erase and other performance issues associated with the NAND flash array. As a result the backup table will differ from the main table during the update latency. Any power failure or reset occurring while the backup copy is not updated, will suffer from inaccuracies in the rebuilt table.

It is desirable to provide logical to physical address translation methods that minimize impact of this update latency on the performance of memory systems, including NAND flash based systems.

SUMMARY

A method for maintaining a data set includes storing a base copy of the data set in a first non-volatile memory, where the first non-volatile memory has a first writing speed and can be page mode flash memory, and storing changes to the data set in a first change data set in a second non-volatile memory, where the second non-volatile memory has a second writing speed which can be faster than the first writing speed, and can be byte mode phase change memory. The method also includes generating a current copy of the data set by reading the base copy from the first non-volatile memory and the changes from the second non-volatile memory.

The system can be configured so that when a first threshold number of entries in the first change data set is reached, then the first change data set, or a part of the first change data set, is moved into a second change data set in the first non-volatile memory, by copying entries in the first change data set into the second change data set. The first threshold number can be equal to the size of the second non-volatile memory less a margin, or can be selected according to system configuration parameters to be any size. For example, if the first non-volatile memory is a page mode memory, then the threshold number can be equal to or greater than a page size, and the set of entries to be moved can include the number of entries that can be written using a single page mode write operation in the first non-volatile memory. Alternatively, the set of entries to be moved can be the same as the threshold number of entries. When a second change data set is present, the step of generating a current copy of the data set includes reading the entries in the second change data set.

The system can be configured as well to define a second threshold number of entries in the second change data set in the first non-volatile memory. If the threshold number of entries in the second change data set is reached, then the current copy of the data set is generated by reading the base copy of the data set and the changes in the first and second change data sets. The second threshold number can be greater than the first threshold number. For example, the first threshold number can be a page size, and the second threshold number can be two or more pages. The base copy of the data set, the first change data set, and the second change data set can include logical to physical address translation (L2P) data and can be stored in a table.

Other aspects and advantages of the present invention can be seen on review of the drawings, the detailed description and the claims, which follow.

DETAILED DESCRIPTION

A detailed description of embodiments of the logical to physical address translation technology is provided with reference to the Figures.

Figure 1:
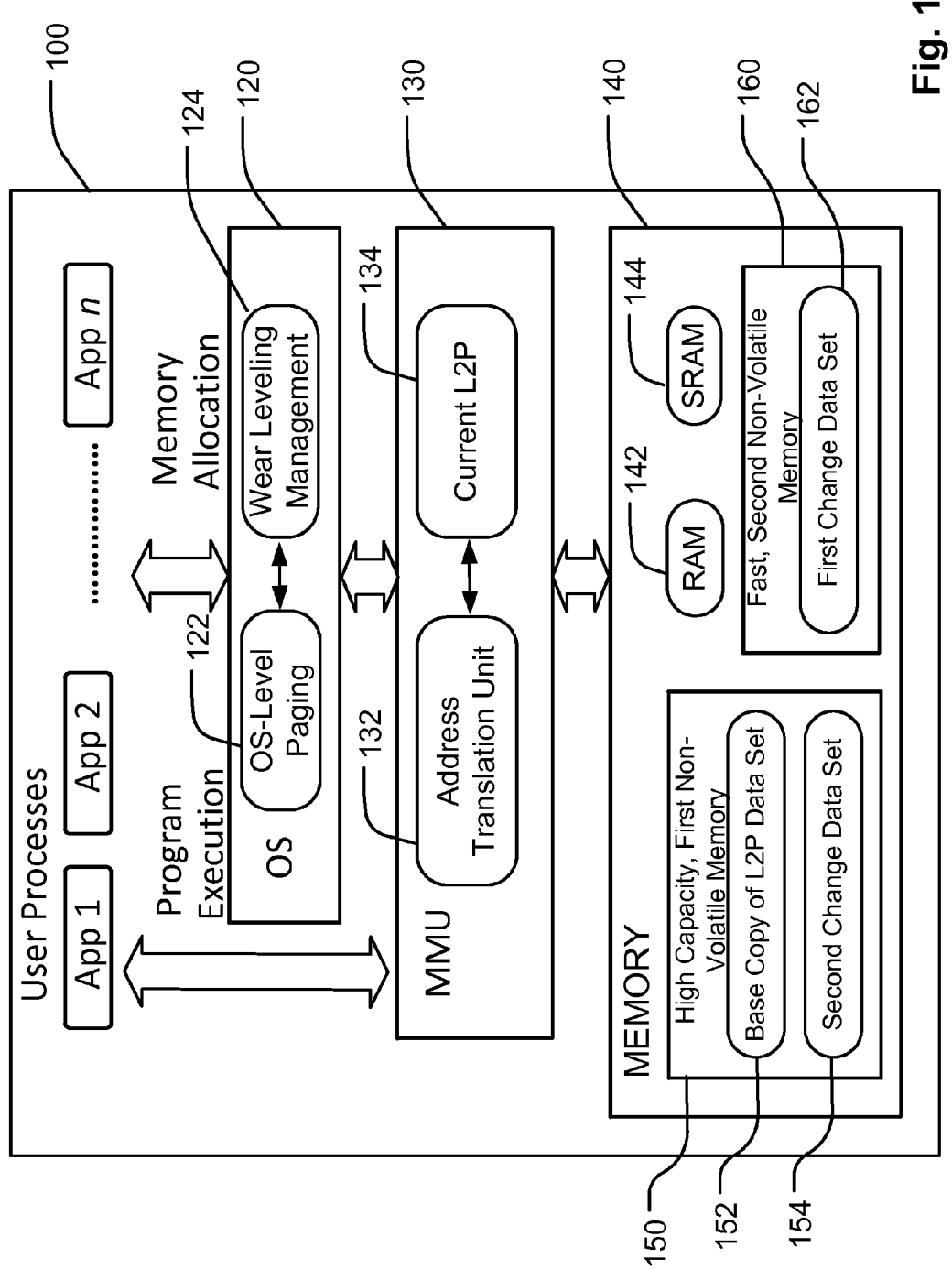
FIG. 1 is a block diagram of an example system including memory management programs.

FIG. 1 is a block diagram of an example system 100 including memory management programs, including a program for maintaining a logical to physical (L2P) address translation data set. The system interfaces with user processes such as App 1, App 2, and App n. The system performs program execution and memory allocation according to the user processes. The system includes an operating system 120 (OS), a memory management unit 130 (MMU), and memory system 140. The operating system 120 includes OS-level paging 122, and wear leveling management 124, and communicates with the memory management unit 130. The memory management unit 130 includes an address translation unit 132, and a current copy of the logical to physical address translation data set (Current L2P) in a high speed, byte mode memory 134, such as SRAM, and communicates with the memory system 140. The memory system 140 can include RAM 142 (such as dynamic random access memory) and SRAM 144 (static random access memory). In alternatives, the host system can keep the current L2P data set in RAM 142 or SRAM 144.

Also, the memory system can include a high capacity, first non-volatile memory 150 to store data having logical addresses and physical addresses identified in the logical to physical address translation data set. The system also includes fast, lower capacity, second non-volatile memory 160. The wear leveling management 124 comprises logic to direct wear leveling processes for the non-volatile memory 150, in cooperation with the logical addressing scheme employed by the OS. The wear leveling management 124 can be implemented as a feature of the OS, or as an add-on memory driver program, for example.

The first non-volatile memory 150 has a first writing speed. The second non-volatile memory 160 has a second writing speed which can be faster than the first writing speed. The first non-volatile memory 150 can include page mode NAND flash memory. The second non-volatile memory 160 can include byte mode phase change memory, or other types of memory that also can have faster write performance than the first non-volatile memory and are preferably, byte addressable, so that the update latency for storing changes to the L2P data set in the second non-volatile memory 160 is much shorter than that required for storing data in the first non-volatile memory 150. Loss of power during an update latency will result in a condition in which a change may be lost, and the backup data may not be current. As a result, a re-boot of the system will be slower as it is required to perform complex tasks to recover an accurate L2P data set.

The system includes data set backup logic, which can reside for example, in the OS 122 or in the address translation unit 132, or both, to store a base copy of the logical to physical address translation data set 152 in the first non-volatile memory 150, to store changes to the data set in a first change data set 162 in the second non-volatile memory 160, and to generate the current copy of the data set 134 by reading the base copy 152 from the first non-volatile memory 150 and the changes from the second non-volatile memory 160. The generated current copy of the data set 134 can be stored at a different location in the first non-volatile memory 150 than the base copy of the data set 152.

The second non-volatile memory can have limited capacity allocated for storage of the first change data set. Thus, there can be a threshold number of entries in the first change data set 162 in the second non-volatile memory 160. The address translation unit 132 can include logic to copy entries in the first change data set 162 into a second change data set 154 in the first non-volatile memory 150 if the threshold number of entries in the first change data set 162 is reached. The logic to generate the current copy of the data set 134 can include reading the entries copied into the second change data set 154 in the first non-volatile memory 150. The base copy of the data set (e.g. 152), the first change data set (e.g. 162), and the second change data set (e.g. 154) can include logical to physical address translation (L2P) data and can be stored in a table.

The first non-volatile memory can have limited capacity allocated for storage of the second change data set. Thus, there can be a threshold number of entries in the second change data set 154 in the first non-volatile memory 150. The address translation unit 132 can include logic to generate the current copy of the data set by reading the base copy of the data set 152 and the changes stored in the second change data set in first non-volatile memory 150 and the changes stored in the first change data set in second non-volatile memory 160 if the threshold number of entries in the second change data set 154 is reached. The threshold number of entries in the second change data set 154 can be greater than the threshold number of entries in the first change data set 162.

For instance, the first change data set 162 in the second non-volatile memory 160, which can include phase change memory, can have allocated a physical memory space of 512, 1024, or 2048 bytes, while the second change data set 154 in the first non-volatile memory 150, which can include NAND flash memory, can have a capacity of many megabytes, and have a physical page size of 2048, 4096 or 8192 bytes. If each entry includes a logical page address of 16 bits, a physical page address of 16 bits, or a total size of 32 bits, then the threshold number of entries in the first change data set 162 would be 128, 256, or 512 for a physical size of 512, 2024, or 2048 bytes, respectively. Similarly, if each entry includes 32 bits, then the threshold number of entries in the second change data set 154, assuming it is limited to one page, is 512, 1024, 2048 for a physical size of 2048, 4096 or 8192 bytes, respectively. In one example configuration, the system can allocate a block in the first non-volatile memory for the combination of the base data set and the second change data set. The threshold number for the second change data set can be equal to the difference between the size of the base data set and the size of the block. In this manner, the process of updating the base data set can clear the old data set and the old second change data set in one block erase. In another example configuration, the system can allocate a block in the first non-volatile memory for the second change data set alone.

Figure 2:
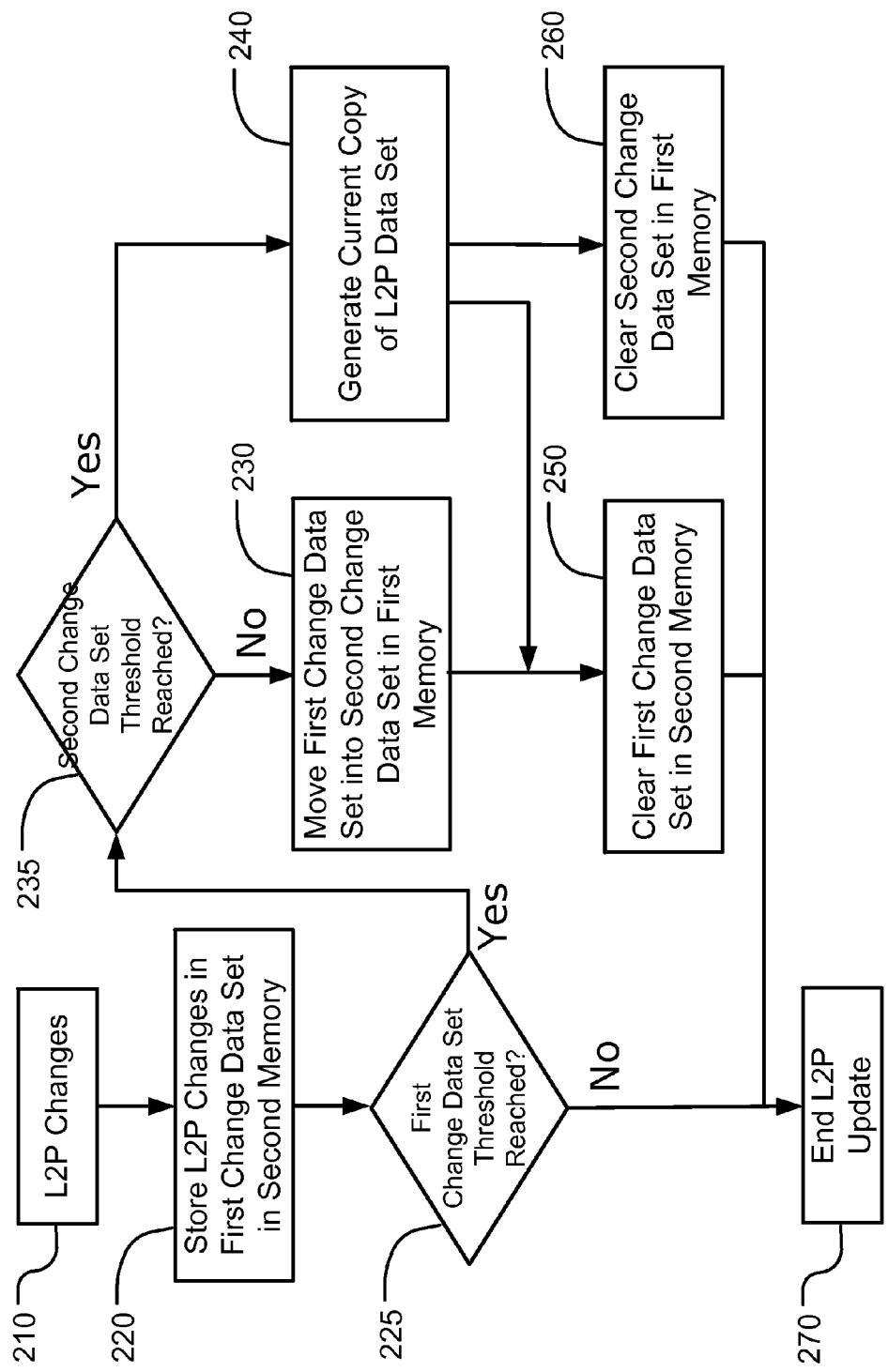
FIG. 2 is a flow chart for maintaining a logical to physical address translation data set.

FIG. 2 is a flow chart for maintaining a logical to physical address translation data set (L2P data set). Wear leveling management (e.g. 124, FIG. 1) as used by user applications (e.g. App 1, App 2, . . . App n, FIG. 1) can cause movement of data having a logical address translated to new physical addresses, and thus require updating of the L2P data set. This update is kept current in the Current L2P, and changes are written to back up the L2P data set into the second non-volatile memory. Unexpected events such as a power failure can cause loss of information of L2P changes if L2P changes are not saved fast enough. Slow updating of the L2P data set can affect the performance of the memory device and the performance of a computing system that uses the memory device.

A controller, such as the address translation unit 132 as described in FIG. 1, is coupled to the wear leveling management 124, the first non-volatile memory 150, and the second non-volatile memory 160. The controller can translate a logical address to a physical address in response to a request from the wear leveling management 124 (or other processes), and thus cause an L2P change to the L2P data set (210, FIG. 2). A base copy of the data set (e.g. 152, FIG. 1) is stored in a first non-volatile memory (e.g. 150, FIG. 1), and changes to the L2P data set, as requested by the wear leveling management for example, can be stored in a first change data set (e.g. 162, FIG. 1) in a second non-volatile memory (e.g. 160, FIG. 1).

When an L2P change occurs (210, FIG. 2), the L2P change is stored in the first change data set (e.g. 162, FIG. 1) in the second non-volatile memory (220, FIG. 2). There is a threshold number of entries in the first change data set (e.g. 162, FIG. 1) in the second non-volatile memory (e.g. 160, FIG. 1). If the threshold number of entries is not reached as indicated by the No branch of the decision block 225 in FIG. 2, updating of the L2P change is ended (270, FIG. 2). If the threshold number of entries is reached as indicated by the Yes branch of the decision block 225 in FIG. 2, then part or all of the first change data set can be moved into a second change data set (e.g. 154, FIG. 1) in the first non-volatile memory (e.g. 150, FIG. 1), by copying entries stored in the first change data set into the second change data set.

There is also a threshold number of entries in the second change data set (e.g. 154, FIG. 1) in the first non-volatile memory. If the threshold number of entries in the second change data set is not reached as indicated by the No branch of the decision block 235 in FIG. 2, entries stored in the first change data set are copied into the second change data set, in the order in which the changes had been stored in the first change data set (oldest first) (230, FIG. 2). If the threshold number of entries in the second change data set is reached as indicated by the Yes branch of the decision block 235 in FIG. 2, then a "garbage collection" routine is called to generate the current copy of the data set by reading the base copy of the data set, and by consolidating the changes stored in the first non-volatile memory and the changes stored in the second non-volatile memory with the base copy of data set (240, FIG. 2). The generated current copy of the data set can be stored at a different location in the first non-volatile memory than the base copy of the data set.

After part or all of the first change data set in the second non-volatile memory is moved into the first non-volatile memory (230, FIG. 2), the corresponding part or all of the first change data set in the second non-volatile memory is cleared, such that more L2P changes can be stored in the first change data set (250, FIG. 2). After the current copy of the data set is generated (240, FIG. 2), the second change data set in the first non-volatile memory and the first change data set in the second non-volatile memory are cleared (250 and 260, FIG. 2).

Figure 3:
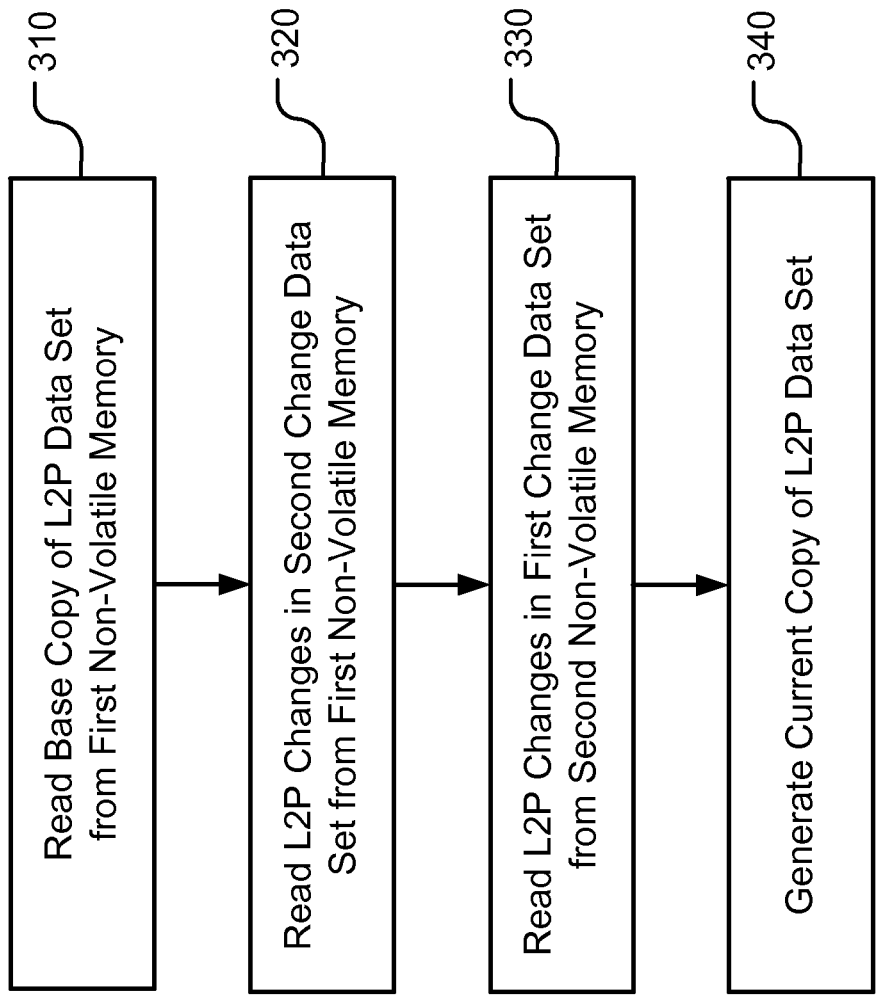
FIG. 3 is a flow chart for generating a current copy of a logical to physical address translation data set.

FIG. 3 is a flow chart for generating a current copy of a logical to physical address translation data set (L2P data set) by reading the base copy of the L2P data set and one or both of the first change data set and the second change data set. A need for generating the L2P data set (e.g. 134, FIG. 1) in this way can arise when the host loses confidence in the current copy of the L2P data set (e.g. Current L2P in memory 134, FIG. 1) used by the memory management unit (e.g. 130, FIG. 1), such as after an unexpected event of a power failure.

The current copy of the L2P data set (e.g. 134, FIG. 1) can be generated (340), in order, by reading data in the base copy of the L2P data set (e.g. 152, FIG. 1) from the first non-volatile memory (e.g. 150, FIG. 1) (310), updating the read data with the L2P changes stored in the second change data set (e.g. 154, FIG. 1) (320) from the first non-volatile memory (e.g. 150, FIG. 1), and updating the first updated data with the L2P changes stored in the first change data set (e.g. 162, FIG. 1) from the second non-volatile memory (e.g. 160, FIG. 1) (330). The generated current copy of the L2P data set can be stored at a different location in the first non-volatile memory than the base copy of the L2P data set.

Figure 4:
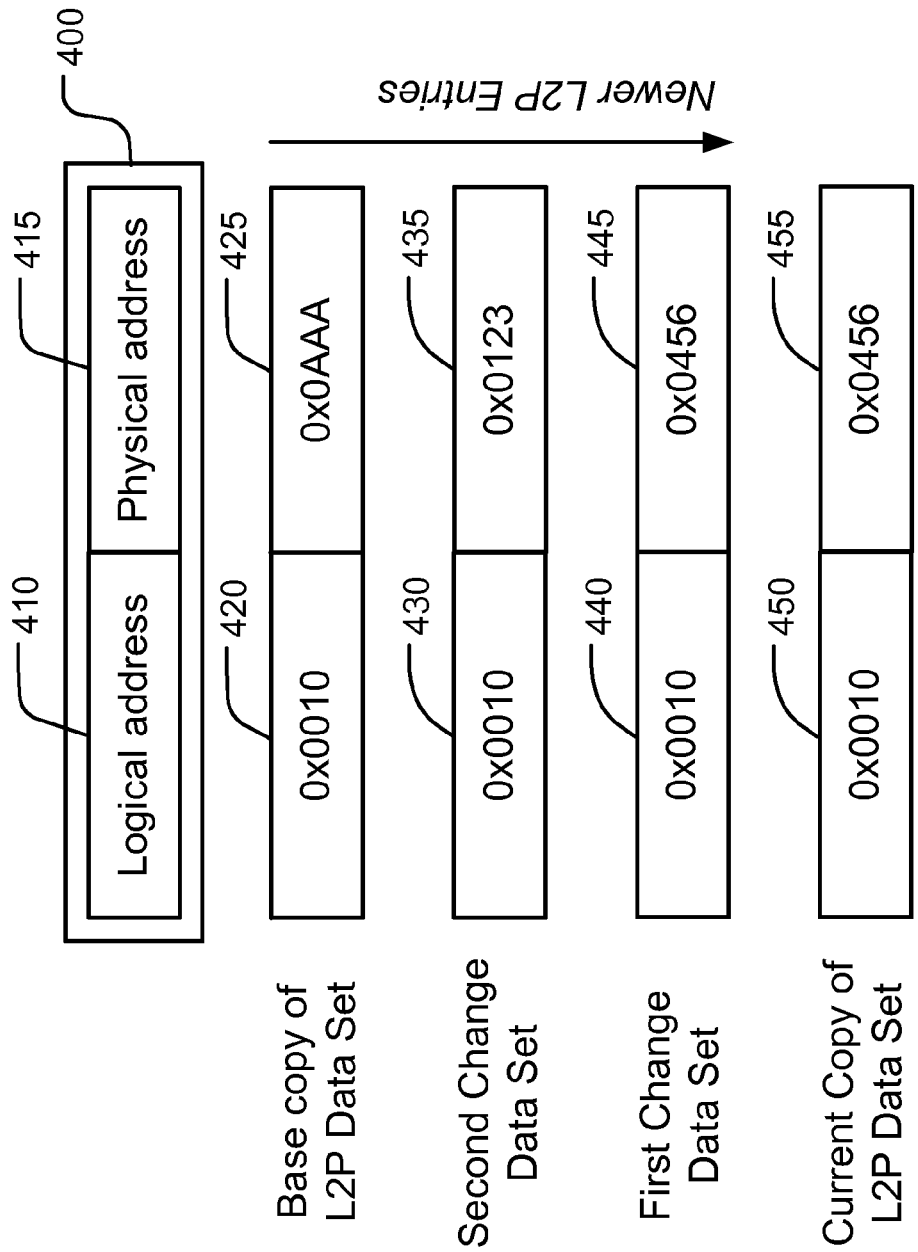
FIG. 4 illustrates entries in change data sets.

FIG. 4 illustrates entries in change data sets. Entries in the first change data set and the second change data set can include a first parameter (e.g. logical address) and a second parameter (e.g. physical address). When a current copy of the L2P data set is generated, a newer entry instead of an older entry in the entries is used, where the new entry and the older entry have a common value for one of the first parameter and the second parameter.

For changes in logical to physical address translation, one of the first parameter and the second parameter in an entry 400 can include a logical address 410 of a page in a plurality of pages, and another of the first parameter and the second parameter can include a physical address 415 of the page, where the plurality of entries can be stored in a volatile memory (e.g. 134 in FIG. 1). As illustrated by the example shown in FIG. 4, the logical address 410 has a value of 0x0010 and can be mapped to a physical address of value 0x0AAA in a base copy of the L2P data set (e.g. 420 and 425). In operations, the logical address of value 0x0010 can be mapped to a physical address of value 0x0123 in the second change data set (e.g. 430 and 435), and mapped to a physical address of value 0x0456 in the first change data set (e.g. 440 and 445). As illustrated by the example shown in FIG. 4, "0x" indicates a hexadecimal number, and a four digit hexadecimal number such as 0x0AAA includes 16 bits, where a single hexadecimal digit includes 4 bits. Thus, an entry including a logical address and a physical address of 16 bits each has a size of 32 bits or 4 bytes, where a byte includes 8 bits.

The L2P change in the second change data set is newer because of the update process, than the corresponding L2P change in the base copy of the L2P data set, and the L2P change in the first change data set is newer than the L2P change in the second change data set. Accordingly, when a current copy of the L2P data set is generated, the newest physical address in the first change data set (i.e. 0x0456) is used for the logical address (i.e. 0x0010).

In one embodiment, the second change data set (e.g. 154, FIG. 1) resides in a page in a plurality of pages in the first non-volatile memory (e.g. 150, FIG. 1). A threshold number of entries for L2P changes to the L2P data set can be limited by the page size in the first non-volatile memory. For example, if an entry includes 4 bytes as described above and the page size in the first non-volatile memory is 2048 bytes, then the threshold number of entries can be 2048/4=512. Similarly, if the page size in the first non-volatile memory is 4096 bytes or 8192 bytes, then the threshold number of entries can be 1024 or 2048.

The latest L2P change is stored in the second non-volatile memory, which can have a faster writing speed than the writing speed of the first non-volatile memory, and therefore a shorter update latency period. Thus, in the event of a power failure, the latest L2P change is less likely to be lost than if the latest L2P change is stored in the first non-volatile memory. As described in connection with FIGS. 3 and 4, a current copy of the L2P data set is generated using the newer entries for L2P changes for entries having the same logical addresses. By storing the latest L2P change in the second non-volatile memory, the current copy of the L2P data set is more likely to recover the latest L2P change.

The second non-volatile memory can have a faster writing speed than the writing speed of the first non-volatile memory. For example, the first non-volatile memory can be a flash memory and the second non-volatile memory can be a phase change memory (PCM). A PCM can have a writing speed of about 100 to 1,000 nanoseconds per entry, while a flash memory can have a writing speed of about 1 millisecond per page, where 1 millisecond is 1 million nanoseconds. Thus by storing the most recent changes in the second non-volatile memory instead of the first non-volatile memory, the writing speed and therefore update latency, can be improved by 1,000 to 10,000 times and consequently the loss of information is minimized. One reason for the shortened update latency can arise if the second non-volatile memory is byte addressable, a byte of data can be updated for L2P changes without erasing a block of data.

Figure 5:
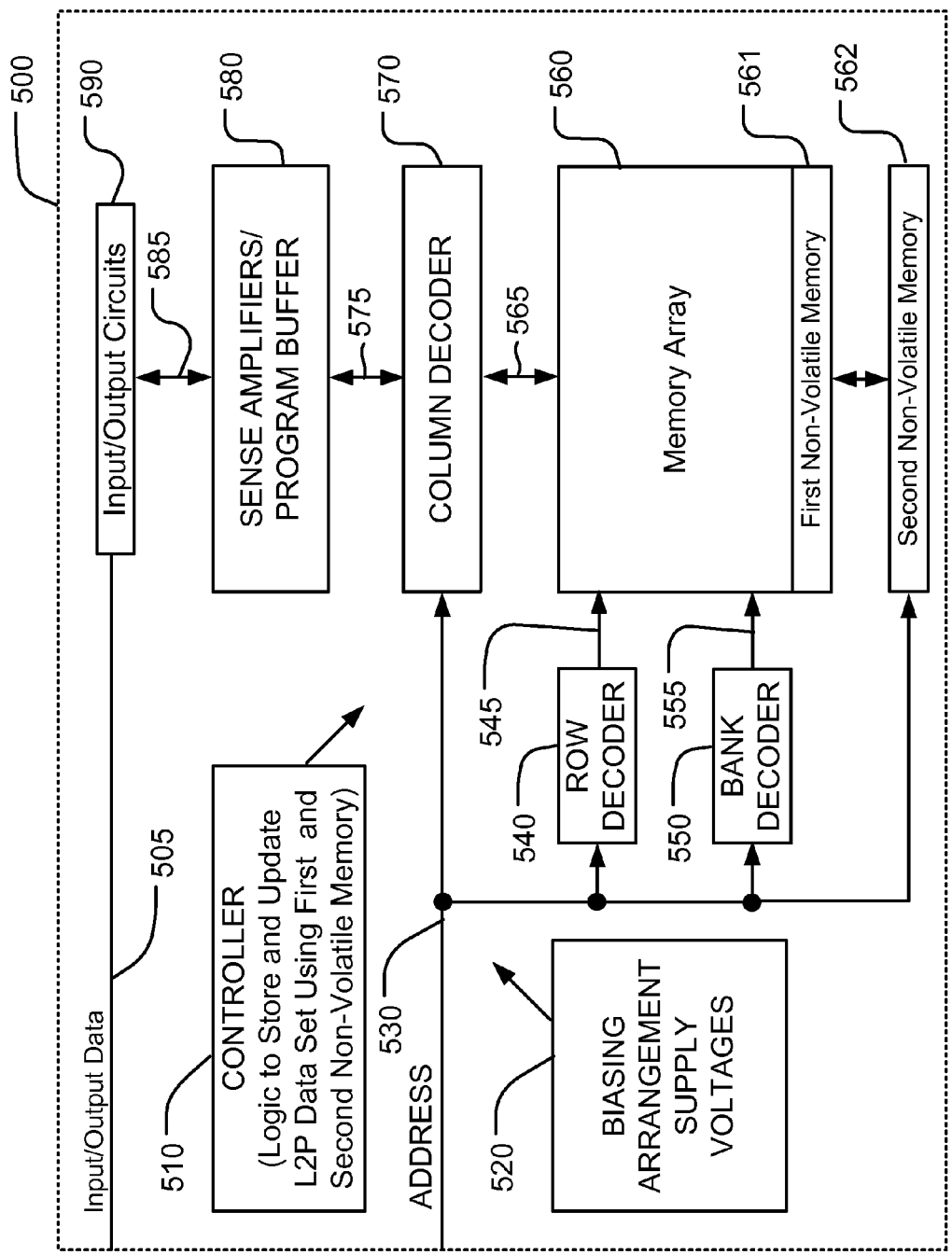
FIG. 5 is a simplified chip block diagram of an integrated circuit memory device according to an embodiment.

FIG. 5 is a simplified chip block diagram of an integrated circuit memory device according to an embodiment. The memory device 500 includes a memory array 560 on an integrated circuit substrate. The memory device 500 includes a first non-volatile memory 561 having a first writing speed, and a second non-volatile memory 562 having a second writing speed which can be faster than the first writing speed.

The first non-volatile memory 561 can include the same type of memory as the memory array 560, for example, NAND flash memory. The second non-volatile memory 562 can include phase change memory, and be byte addressable. In other embodiments, the second non-volatile memory can be byte addressable flash memory, or other types of non-volatile memory.

The memory device 500 includes a controller 510 coupled to the first non-volatile memory 561 and the second non-volatile memory 562. The controller 510 includes, in some embodiments, logic to manage the backup copy of the L2P data set, including the base copy, the first change data set and the second change data set as described in detail above. Alternatively, the logic to manage the backup copy of the L2P data set can be off chip, in a memory controller chip for example.

A row decoder 540 is coupled to a plurality of word lines 545, and arranged along rows in the memory array 560. A column decoder 570 is coupled to a plurality of bit lines 565 arranged along columns in the memory array 560 for reading data from and writing data to the memory array 560. A bank decoder 550 is coupled to a plurality of banks in the memory array 560 on bus 555. Addresses are supplied on bus 530 to column decoder 570, row decoder 540 and bank decoder 550. Sense amplifiers and a program buffer in block 580 are coupled to the column decoder 570, in this example via a number of data lines 575. Sensed data from the sense amplifiers are supplied via data lines 585 to input/output circuits 590 via data bus 585. Input/output circuits 590 drive the data to destinations external to the integrated circuit 500. Input/output data is moved via data bus 505 between the input/output circuits 590 and input/output ports on the integrated circuit 500 or other data sources internal or external to the integrated circuit 500, such as a general purpose processor or special purpose application circuitry, or a combination of modules providing system-on-a-chip functionality supported by the memory array 560.

In the example shown in FIG. 5, the controller 510 using a bias arrangement state machine controls the application of bias arrangement supply voltage generated or provided through the voltage supply or supplies in block 520, such as read and program voltages. The controller 510 is coupled to the first non-volatile memory 561, the second non-volatile memory 562, and the memory array 560. The controller 510 includes logic to move data to the memory array in a write mode, and from the memory array in a read mode.

The controller 510 can be implemented using special-purpose logic circuitry as known in the art. In alternative embodiments, the controller comprises a general-purpose processor, which can be implemented on the same integrated circuit, which executes a computer program to control the operations of the device. In yet other embodiments, a combination of special-purpose logic circuitry and a general-purpose processor can be utilized for implementation of the controller.

Figure 6:
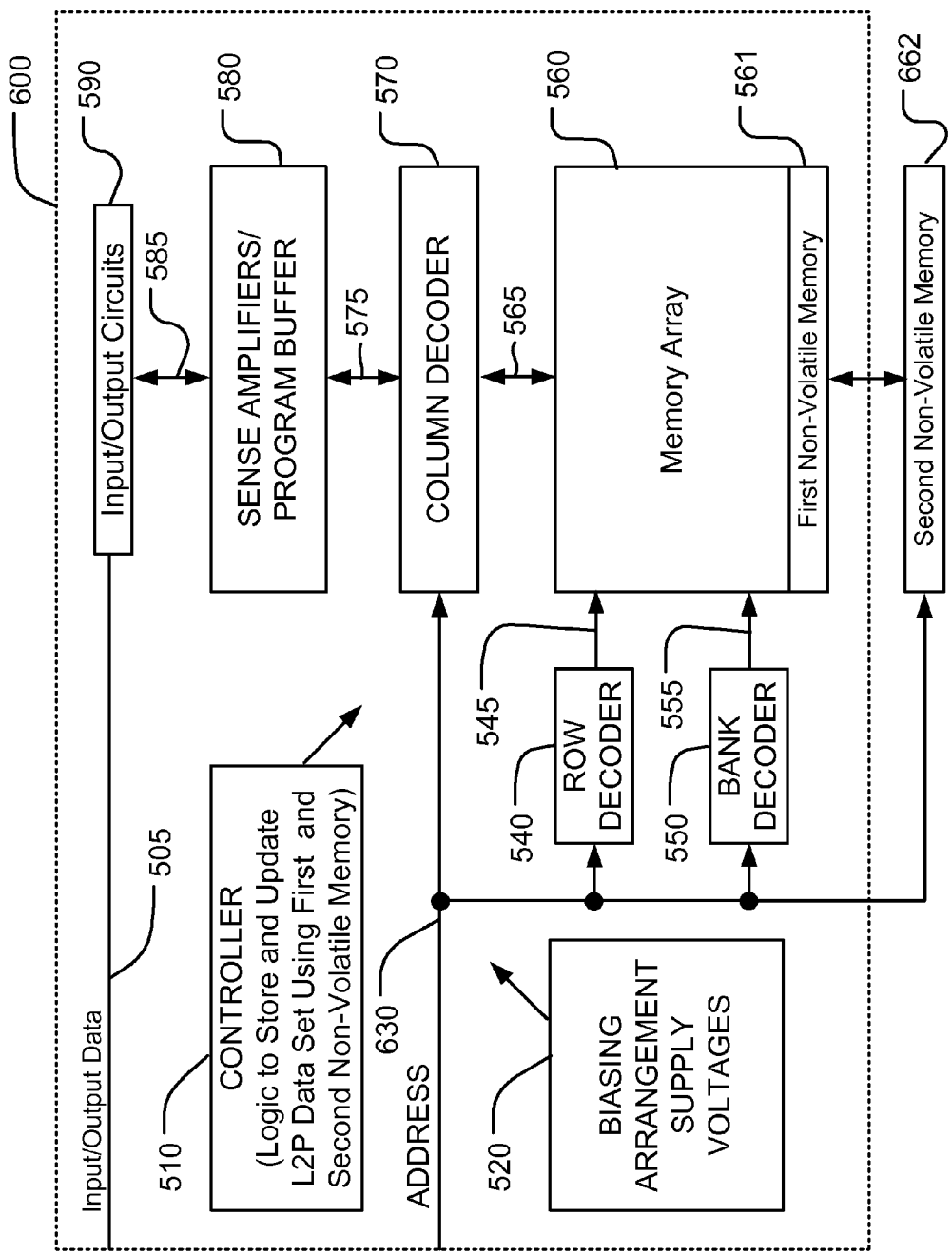
FIG. 6 is a simplified chip block diagram of an integrated circuit memory device according to an alternative embodiment.

FIG. 6 is a simplified chip block diagram of an integrated circuit memory device according to an alternative embodiment. Reference numerals in FIG. 5 are generally applicable to FIG. 5. The difference between FIG. 5 and FIG. 6 is that the second non-volatile memory 562 in FIG. 5 is on-chip, or internal to the memory device 500, while the second non-volatile memory 662 in FIG. 6 is off-chip, or external to the memory device 600. In FIG. 5, the second non-volatile memory 562 shares the address 530 with the memory array 560 in FIG. 5, while the second non-volatile memory 662 shares the address 630 with the memory array 560 in FIG. 6.

The method and memory device disclosed herein can be used with large data sets, including logical to physical address translation data sets, in a memory device that needs to be reliably backed up and is subject to random updates. The method and memory device disclosed herein can be used with a logical to physical address translation data set for page mode algorithms or block mode algorithms. Page mode algorithms require more pages in a memory device to store per-page mapping information than block mode algorithms which require per-block mapping information. The method and memory device disclosed herein can improve the boot performance of a memory device and thus improve the boot performance of a computing system that uses the memory device.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for maintaining a data set, comprising:
storing a base copy of the data set in a first non-volatile memory, the first non-volatile memory having a first writing speed;
storing a current copy of the data set in a working memory, and making changes to the current copy;
storing the changes to the data set in a first change data set in a second non-volatile memory which is different than the working memory, the second non-volatile memory having a second writing speed, wherein there is a threshold number for a number of entries in the first change data set in the second non-volatile memory; and
moving part or all of the first change data set into a second change data set in the first non-volatile memory if the number of entries in the first change data set in the second non-volatile memory reaches the threshold number.

2. The method of claim 1, wherein the second writing speed is faster than the first writing speed.

3. The method of claim 1, further comprising generating a current copy of the data set by reading the base copy from the first non-volatile memory, the first change data set from the second non-volatile memory, and the second change data set in the first non-volatile memory.

4. The method of claim 3, wherein there is a threshold number of entries in the second change data set in the first non-volatile memory, and if the threshold number of entries in the second change data set is reached, then generating the current copy of the data set by reading the base copy of the data set from the first non-volatile memory and the first change data set and the second change data set, wherein the threshold number of entries in the second change data set is greater than the threshold number of entries in the first change data set.

5. The method of claim 3, wherein said moving includes moving the changes stored in the first change data set from the second non-volatile memory into the second change data set in the first non-volatile memory in the order in which the changes were stored in the first change data set.

6. The method of claim 4, further comprising clearing the second change data set in the first non-volatile memory and clearing the first change data set in the second non-volatile memory after the current copy of the data set is generated.

7. The method of claim 1, further comprising clearing the second non-volatile memory after the first change data set in the second non-volatile memory is moved into the second change data set in the first non-volatile memory.

8. The method of claim 1, wherein first non-volatile memory comprises NAND flash memory, the second non-volatile memory includes phase change memory.

9. The method of claim 1, wherein the first non-volatile memory is a page mode memory and the second non-volatile memory is a byte mode memory.

10. A method for maintaining a logical to physical address translation data set for a first non-volatile memory having a first writing speed, comprising:
storing a base copy of the address translation data set in said first non-volatile memory;
storing a current copy of the address translation data set in a working memory, and making changes to the current copy;
storing the changes to the address translation data set in a first change data set in a second non-volatile memory which is different than the working memory, the second non-volatile memory having a second writing speed, wherein there is a threshold number for a number of entries in the first change data set in the second non-volatile memory; and
moving part or all of the first change data set into a second change data set in said first non-volatile memory if the number of entries in the first change data set in the second non-volatile memory reaches the threshold number.

11. The method of claim 10, wherein the second writing speed is faster than the first writing speed, further comprising generating the current copy of the address translation data set by reading the base copy from said first non-volatile memory, the first change data set from the second non-volatile memory, and the second change data set in the first non-volatile memory.

12. The method of claim 11, wherein there is a threshold number of entries in the second change data set in said first non-volatile memory, and if the threshold number of entries in the second change data set is reached, then generating the current copy of the address translation data set by reading the base copy of the data set from said first non-volatile memory and the first change data set and the second change data set, wherein the threshold number of entries in the second change data set is greater than the threshold number of entries in the first change data set.

13. The method of claim 12, wherein entries in the first change data set and the second change data set include a logical address and a physical address, said generating a current copy of the address translation data set further comprising using a newer entry instead of an older entry in the entries wherein the newer entry and the older entry have a common value for the logical address.

14. The method of claim 10, wherein the first non-volatile memory is a page mode memory and the second non-volatile memory is a byte mode memory.

15. A memory system which backs up a data set, comprising:
a first non-volatile memory having a first writing speed;
a second non-volatile memory having a second writing speed; and
data set backup logic coupled to the first non-volatile memory and the second non-volatile memory, including logic to store a base copy of a data set in the first non-volatile memory, to store changes to the data set in the second non-volatile memory, wherein there is a first threshold number for a number of changes for the second non-volatile memory, to move the changes stored in the second non-volatile memory to the first non-volatile memory if the number of changes in the first change data set in the second non-volatile memory reaches the first threshold number, and to generate a current copy of the data set by reading the base copy from the first non-volatile memory, the changes from the first non-volatile memory, and the changes from the second non-volatile memory.

16. The memory system of claim 15, wherein the second writing speed is faster than the first writing speed.

17. The memory system of claim 15, wherein the first non-volatile memory comprises NAND flash memory, the second non-volatile memory includes phase change memory.

18. The memory system of claim 15, wherein there is a second threshold number of changes in the first non-volatile memory, the data set backup logic further including logic to generate the current copy of the data set by reading the base copy of the data set from the first non-volatile memory and the changes stored in the first non-volatile memory and in the second non-volatile memory if the second threshold number in the first non-volatile memory is reached, wherein the second threshold number is greater than the first threshold number.

19. The memory system of claim 15, wherein the first non-volatile memory is a page mode memory and the second non-volatile memory is a byte mode memory.

20. A system comprising:
  memory management logic including a logical to physical address translation data set in a working memory, and which makes changes to the address translation data set in the working memory;
  a first non-volatile memory coupled to the memory management logic to store data having logical addresses and physical addresses identified in the logical to physical address translation data set, and having a first writing speed;
  a second non-volatile memory which is different than the working memory, and is coupled to the memory management logic having a second writing speed; and
  data set backup logic, coupled to the memory management logic, to the first non-volatile memory and to the second non-volatile memory, including logic to store a base copy of the address translation data set in the first non-volatile memory, to store the changes to the address translation data set in a first change data set in the second non-volatile memory, wherein there is a first threshold number for a number of changes for the second non-volatile memory, and to move part or all of the first change data set into a second change data set in the first non-volatile memory if the number of changes in the first change data set in the second non-volatile memory reaches the first threshold number.

21. The system of claim 20, wherein the second writing speed is faster than the first writing speed, and the data set backup logic further including logic to generate a current copy of the address translation data set by reading the base copy from the first non-volatile memory and the first change data set from the second non-volatile memory.

22. The system of claim 21, wherein the logic to generate a current copy of the data set includes reading the second change data set from the first non-volatile memory.

23. The system of claim 22, wherein there is a second threshold number of changes in the first non-volatile memory, the data set backup logic further including logic to generate the current copy of the data set by reading the base copy of the data set from the first non-volatile memory, the second change data set from the first non-volatile memory, and the first change data set from the second non-volatile memory if the second threshold number in the first non-volatile memory is reached, wherein the second threshold is greater than the first threshold.

24. The system of claim 20, wherein the first non-volatile memory includes NAND flash memory storing the base copy of the data set for use by the data set backup logic, and the second non-volatile memory includes phase change memory storing the changes to the data set.

25. The system of claim 20, wherein the first non-volatile memory is a page mode memory and the second non-volatile memory is a byte mode memory.

* * * * *